United States Patent [19]
Bédard et al.

[11] Patent Number: 5,526,414
[45] Date of Patent: Jun. 11, 1996

[54] DYNAMICALLY CONTROLLED ROUTING USING VIRTUAL NODES

[75] Inventors: Francois Bédard, Verdun; Jean Régnier, Laval; France Caron, Verdun, all of Canada

[73] Assignee: Northern Telecom Limited, Montreal, Canada

[21] Appl. No.: 329,716

[22] Filed: Oct. 26, 1994

[51] Int. Cl.$^6$ .............................. H04M 7/00; H04M 3/42; H04J 3/24
[52] U.S. Cl. ................ 379/221; 370/94.1; 379/207; 379/220; 379/224; 379/225
[58] Field of Search ................................ 379/207, 219, 379/220, 221, 224, 225; 370/94.1

[56] References Cited

U.S. PATENT DOCUMENTS

| | | | |
|---|---|---|---|
| 4,284,852 | 8/1981 | Szybicki et al. | 379/221 |
| 4,669,113 | 5/1987 | Ash et al. | 379/221 |
| 4,788,721 | 11/1988 | Krishnan et al. | 379/221 |
| 5,297,137 | 3/1994 | Ofek et al. | 370/94.1 X |
| 5,377,262 | 12/1994 | Bales et al. | 379/221 |

OTHER PUBLICATIONS

*Dynamically Controlled Routing*, by Hugh Cameron and Serge Hurtubise, Telesis 1986 one pp. 33–37.
*State–Dependent Dynamic Traffic Management for Telephone Networks* by Jean Régnier and W. Hugh Cameron, IEEE Communications Magazine Oct. 1990 pp. 42–53.
*Design and Optimization of Networks with Dynamic Routing*, by G. R. Ash, R. H. Cardwell and R. P. Murray, The Bell system Technical Journal, vol. 60, No. 8, Oct. 1981 pp. 1787–1820.
*Servicing and Real–Time Control of Networks With Dynamic Routing*, by G. R. Ash, A. H. Kafker and K. R. Krishnan, The Bell System Technical Journal vol. 60, No. 8, Oct. 1981 pp. 1821–1845.

Primary Examiner—Jeffery Hofsass
Assistant Examiner—Harry S. Hong
Attorney, Agent, or Firm—Thomas Adams

[57] ABSTRACT

A dynamically controlled routing (DCR) telecommunications network is formed by a plurality of network switching elements, each connected to at least one other by at least one circuit group for carrying calls therebetween, and a network processor connected to the network elements by data links. Each network switching element determines, for each call, a neighboring network element to which it should be routed. It does so by accessing a routing table which contains alternate routes to be attempted if a direct route either does not exist or cannot be used. The routing tables are updated periodically by the network controller. The DCR network functions as a group of nodes interconnected by links and routing takes place on a node-to-node basis. At least one of the nodes is a logical entity which does not necessarily have a direct correspondence to a single physical network element but rather corresponds to a group of at least one physical component which may be a network element, a part of a network element, or a plurality of network elements or parts thereof. Likewise, a link to the virtual node does not necessarily correspond to a circuit group but comprises the set of direct circuit groups connecting to the components of the virtual node. DCR networks employing virtual nodes have increased flexibility. For example, final destinations outside the DCR network can be associated with the virtual node ifs an intermediate destination node, thereby allowing a call to exit the DCR network via any of the components of the virtual node rather than via only one Unique Exit Gateway.

6 Claims, 3 Drawing Sheets

DYNAMICALLY CONTROLLED ROUTING USING VIRTUAL NODES

FIELD OF THE INVENTION

This invention relates to telecommunications networks and, in particular, to telephone networks employing dynamically controlled routing of calls.

BACKGROUND ART

For many years, the standard call routing method used by most North American telephone compares has been fixed hierarchical routing (FHR). In networks employing FHR, calls are sent from their origin network node to their destination network node along routes comprising a predetermined sequence of connection paths using circuit groups (trunk groups) between successive nodes. At an origin node, a call is offered first to a direct circuit group. If all direct circuits am busy, the call is routed via a tandem node. Should this alternative route prove to be busy as well, the network continues to search for a path, selecting alternative routes in a fixed, predetermined sequence from the most-direct to the least-direct route. Finally, if no connecting route can be found, the network blocks the call. The predetermined sequence of alternative routes is programmed into the network equipment and is "fixed" in the sense that any changes require human intervention.

While FHR remains the most prevalent routing method in North America, a number of developments, for example new services, deregulation, have led suppliers of telephone services to seek a more flexible alternative. As a result, in recent years, networks employing dynamic traffic management have been introduced, particularly so-called Dynamically Controlled Routing (DCR) networks which make use of the capabilities of modern stored program control switches with high-availability, real-time data processing abilities and the "intelligence" of a computer called the network processor (NP) to monitor the network and change the routing patterns periodically, in "near real-time". A general discussion of FHR and DCR networks appears in an article entitled "Dynamically Controlled Routing" by Hugh Cameron and Serge Hurtubise, in Telesis, Vol 1, 1986, published by Bell-Northern Research. An early version of dynamically controlled routing is disclosed in U.S. Pat. No. 4,284,852 issued August 1981.

DCR yields significant advantages in network control. Thus, it ensures the efficiency of switching equipment by preventing excessive traffic from reaching the machine; inhibits the spread of switching congestion; maintains circuit-group/trunk efficiency by reducing the number of links per call when facilities are congested; and makes full use of available idle facilities. Of particular advantage is the DCR system's capability of coping with failure of a switch. The DCR network processor can download routing instructions for neighbouring switches enabling them to use available links to carry tandem traffic around the failed switch. These features of DCR greatly improve the percentage of calls which are successfully routed through the network. Even so, increasing competition amongst suppliers of telephone services has motivated them to find ways of using the network equipment more efficiently to reduce costs and improve the completion rate of traffic handled by their networks.

One aspect susceptible of improvement is the procedure governing the way in which a call exits the DCR network for a final destination outside the DCR network, possibly in another network. Known DCR networks use a procedure inherited from FHR known as Unique Exit Gateway. Since there are many different destinations, most of them outside the DCR network, each final destination is associated with an intermediate destination node within the DCR network. Calls in the DCR network which are destined for a particular final destination are then routed to the associated intermediate destination node. From the intermediate destination node, the calls are routed to the final destination, possibly using other networks than the DCR network. If the intermediate destination node is affected by congestion or a failure, all calls associated with that intermediate destination node will be affected. Although other networks elements might be able to route calls to the final destination, the DCR network is not allowed to use them as alternative exit points. This detracts from the improvements in survivability that can be achieved by DCR networks in case of equipment failures.

SUMMARY OF THE INVENTION

The present invention seeks to mitigate this problem and provide improved traffic management in DCR networks. To this end, the present invention provides a telecommunications network comprising:

a plurality of network nodes and links,
   the network nodes comprising origin nodes, each comprising a switching element capable of routing calls within the network, and destination nodes serving as destinations for such calls, some of the network nodes being tandem nodes, each tandem node serving as both a destination node and an origin node;
   each link interconnecting directly an origin node and a destination node and comprising one or more circuit groups,
each of the switching elements having storage means for routing information, the routing information comprising (i) a listing of destination nodes; (ii) associated with each destination node, a corresponding link, where such a link exists; (iii) for each link, a corresponding group of one or more circuit groups outgoing from the switching element; and (iv) associated with each destination node, a list of zero or more tandem nodes;
the network further comprising means for updating the routing information;
   each switching element comprising means for translating address data of a call to determine a destination node for the call and
   (i) where a link to the destination node exists attempting to route the call to the destination node via a circuit group that is in the link;
   (ii) where a link to the destination node is not available, accessing its routing table to select a tandem node and attempting to route the call via a link to the tandem node;
wherein said listing of destination nodes of at least one of said switching elements comprises a virtual destination node representing a group of two or more components, each component being a distinct physical network element, there being one or more distinct circuit groups associated with each component, and each link from a particular origin node to the virtual destination node is a set of circuit groups from the switching element at that particular origin node to the two or more components of the virtual destination node.

The updating means may comprise network processor means communicating with the switching elements via a data communications system, such network processor means computing alternate routing information in dependence upon the information communicated thereto by all of the switching elements and periodically updating the information identifying tandem nodes.

The network processor means may comprise a common network processor coupled to each said switching element by the data communications system. Periodically, each said switching element communicates to such common network processor information about network conditions local to the switching element and receives from the network processor alternate routing information including recommended tandem nodes. The network processor computes the alternate routing information for each switching element in dependence upon the information communicated thereto by all of the switching elements, and updates tandem node recommendations involving the virtual destination node on the basis of information communicated to the network processor by the switching elements.

Where a link to the virtual node comprises a plurality of circuit groups, the storage means of each switching element may include specified proportions for those circuit groups and, when attempting to route a call via the link to the virtual node, the switching element may attempt the circuit groups randomly and in dependence upon the specified proportions.

A component of a virtual destination node represents a single physical network element. A virtual destination node could comprise a group of separate switches. Each component of the virtual destination node may itself act as a node.

A link does not necessarily represent a single circuit group.

Preferably, when computing alternate route recommendations, the network processor takes into account full availability of each of the links, including links composed of a plurality of circuit groups.

BRIEF DESCRIPTION OF THE DRAWINGS

Various objects, features, aspects and advantages of the present invention will become more apparent from the following detailed description, taken in conjunction with the accompanying drawings, of a preferred embodiments of the invention.

DESCRIPTION OF PREFERRED EMBODIMENT

1. The DCR Network (without Virtual Nodes)

Figure 1:
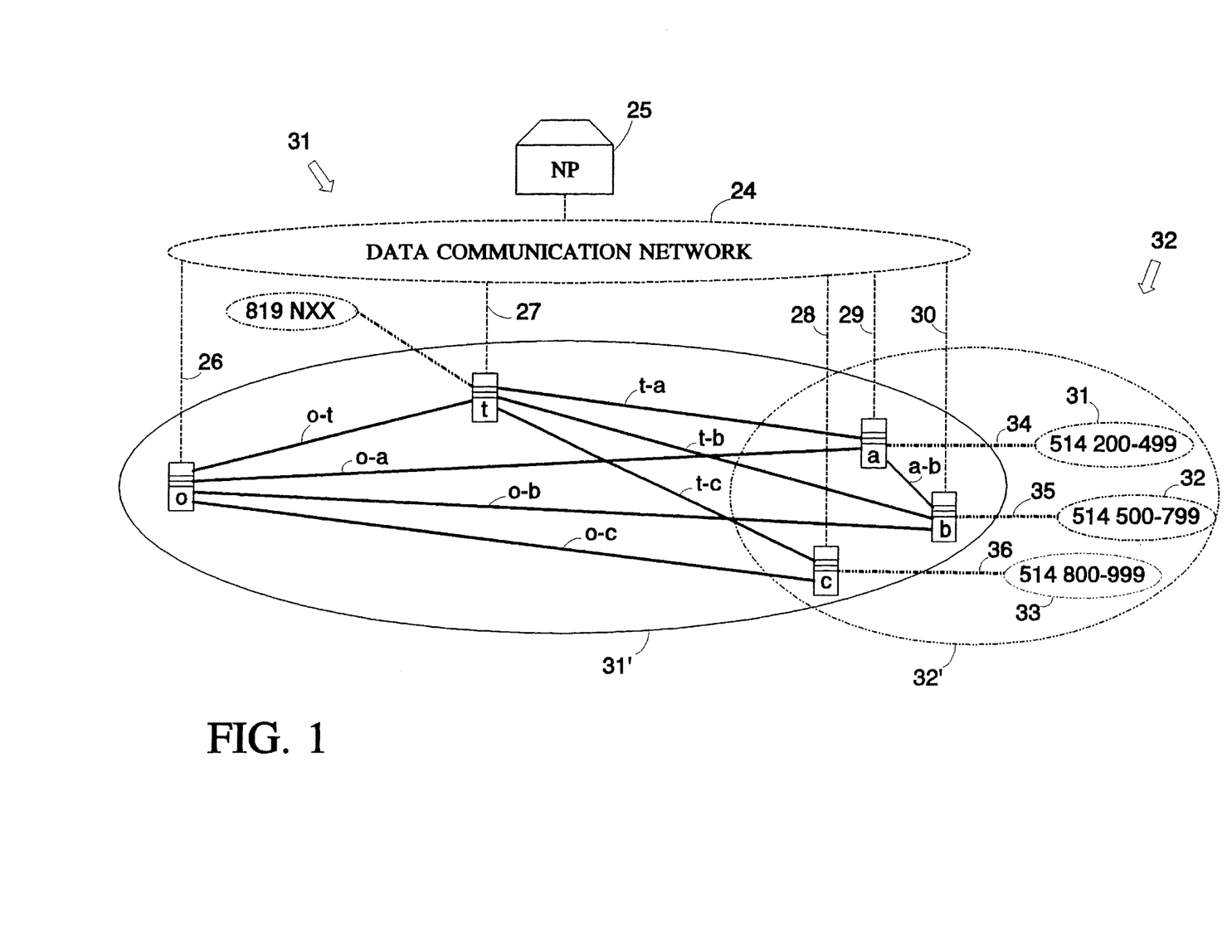
FIG. 1 is a simplified diagram of a DCR network and a second (terminating) network according to the prior art.

Before the preferred embodiment of the invention is described, a simplified DCR network, and its operation, will be described briefly with reference to FIG. 1 in order to facilitate comprehension of how and where the virtual nodes of the present invention are to be implemented. For purposes of illustration only, the DCR network illustrated in FIG. 1 is shown as comprising five circuit switches interconnected by sets of circuit groups. Lower case letters o, t, a, b and c have been used to designate the switches and the circuit groups are identified by pairs of letters o-t, o-a, o-b, o-c, t-a, t-b, t-c and a-b, representing the two switches they are connecting. It should be noted that a circuit group may be two-way, i.e. o-t is used from o to t and from t to o.

A data communications network 24 connects a network processor 25 to the switches o, t, c, b and a by way of data lines 26, 27, 28, 29 and 30 respectively. The data communications network may comprise a packet switched network or dedicated lines of known type which will not be described in detail here.

Each of the DCR switches o, t, a, b and c will have memory for storing information in the form of tables, including translation and routing tables, which the switch will use when routing a call, as will be described later.

Even though the DCR alternate route selection process is centralized, routing is still performed locally by the switches. Therefore, a means of representing the network that can be used both locally by the switches and globally by the NP needs to be defined. For this purpose the DCR system uses a model of the network that describes the network as a set of nodes, links and origin-destination (O-D) pairs.

Nodes represent switches known to the DCR network elements and to the NP.

Routing always proceeds from an origin node to a destination node. Generally speaking, all nodes are known to all other nodes, because DCR has a global view of the network.

A link is the set of all DCR circuit groups from a node to another node. Links are directional, so the link A-B (from node A to node B) and the link B-A (from node B to node A) are different, even though they might use the same physical circuit groups. In the DCR network shown in FIG. 1, each of the switches o, t, a, b and c would typically act as a network node and each of the two-way circuit groups o-t, o-a, o-b, o-c, t-a, t-b, t-c and a-b would be part of two links (one for each direction), but it should be noted that such correspondence is not necessarily the case in embodiments of the invention.

Participating switches o, t, a, b and c within the DCR network 31 report to the network processor 25 periodically, for example every ten seconds, with information concerning the status of their associated circuit groups and traffic volumes. Typically, each switch will monitor and report the occupancy of its outgoing circuit groups, and particulars of the calls processed during the previous 10 second period, such as how many calls overflowed the direct link.

The network processor 25 processes the information from all of the communicating switches o, t, a, b and c to locate the capacity available for supporting additional calls and to determine, for each node, the best alternate route for calls which cannot be routed via the direct route. These alternate routes are communicated to the respective switches as recommendations. The switches o, t, a, b and c update their routing tables accordingly.

These dynamic alternate routes must be only two links long with one intervening "tandem" node. In practice, the recommendation from the NP identifies the tandem node for each destination node listed at that switch. The selection of the tandem node is based upon the idleness of the two links. The NP 25 evaluates the idle capacity of all potential routes, and selects the route with the maximum idle capacity as the recommendation. The idle capacity of an alternate route is considered to be the minimum of the capacity of its two links. This evaluation also takes into account the use of each link by its direct traffic. A protective allowance for direct traffic is considered in the evaluation of the idle capacity. This enables alternate-routed calls to be deflected from routes likely to be required for supporting direct-routed calls. Hence, when a link has only a few idle circuits available, it will not be used to carry overflow calls from other nodes so as to prevent overflow calls from cascading through the network and blocking direct traffic in one link after another.

The whole process, from communication of measurements to the network processor 25 to implementation of the recommendations, occurs within the update cycle, and repeats every update cycle to maintain the alternate routes adapted to current networks conditions.

In DCR networks, routing is node-and-link based, rather than switch and circuit group based. Routing decisions at the switches depend upon the origin node and the destination node. When routing a call, each of the DCR switches o, t, a, b and c will use various tables, including translation and routing tables, to determine from the call the corresponding destination node and outgoing circuit groups to attempt in order to dispose of the call. Thus, when a switch receives a call it will first try to send it to the destination node by the direct route, if it exists. If the call is unable to take the direct route, the switch will then refer to its routing table for the best available route using a tandem node and two links as per the most recent update. Generally, the alternative routes will only comprise two links. Alternative routes which comprise three links are usually not permitted. If there is neither a direct route nor a two-link route from the node handling the call and the destination node, the call is routed via a fixed link to a node closer to its destination node.

For example, if a call originates in the DCR network 31 at switch o and is to be routed to switch b, switch o will use its translation and routing tables to determine that the direct route is via circuit group o-b and attempt to route the call by that route. If the attempt fails, the switch o will select the recommended alternate route from its routing tables and attempt that. (The alternate route would also be selected if a direct link did not exist). Although the DCR network has two such alternate routes between switch o and switch b, only that which has been recommended by the network processor 25 will be attempted, for example via circuit group o-t, switch t and circuit group t-a.

Most final destinations would, in fact, be outside the DCR network 31. Thus, in FIG. 1, the boundary of the DCR network 31 is represented by an ellipse 31'. The boundary of a separate network 32 is illustrated by chain-link ellipse 32'. This separate network need not be a DCR network but could, for example, be an FHR network. It will be seen that switches a, b and c are common to both the DCR network 31 and the separate network 32. Switches a, b and c are shown associated, as by lines 34, 35 and 36, respectively, with final destinations within the 514 Numbering Plan Area. Likewise, final destinations within the 819 Numbering Plan Area are shown associated with switch t. These final destinations are outside the DCR network 31. Each such external final destination is associated with an intermediate destination node within the DCR network 31. A call is not allowed to exit from the DCR network via a node which is not its intermediate destination node. All other destinations handled by the network must be assigned to some specific destination node.

Thus, in FIG. 1, a call originating from the DCR network at switch o with a final destination 514 254 1111 would be routed to switch a by the DCR network. From there, network 32, now the terminating network, would attempt to route the call to its final destination. While network 32 might be capable of routing calls from switch b to that final destination, it is not given an opportunity to do so because the call to final destination 514 254 1111 is not allowed to exit the DCR network via switch b. The DCR network 31 might use switch b as a tandem, e.g. o→b→a, but the call may only exit via its designated intermediate destination node which in this case represents switch a.

It will be appreciated that the intermediate destination node is critical and congestion or failure at its switch would result in failure to complete the call. Clearly, this detracts from the improvements in call completion rate and survivability attained by the DCR network 31. The present invention addresses the problem by means of virtual nodes.

2. DCR with Virtual Nodes

Figure 2:
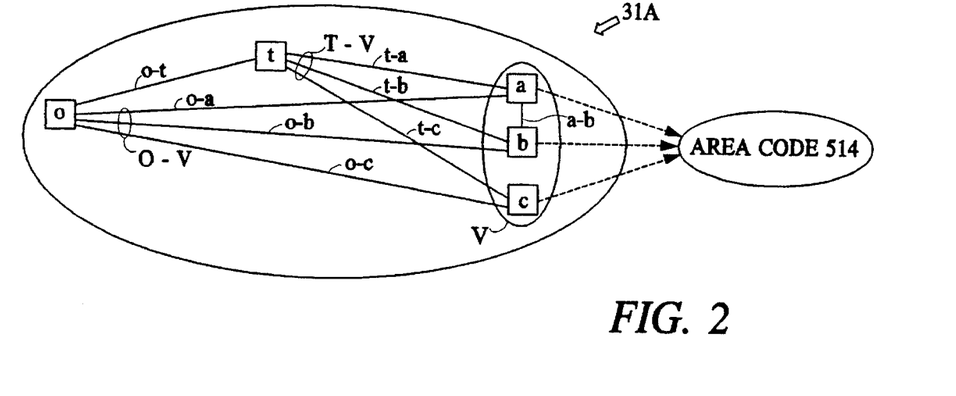
FIG. 2 represents switches and circuit groups of a DCR network employing a virtual node according to the present invention.
Figure 3:
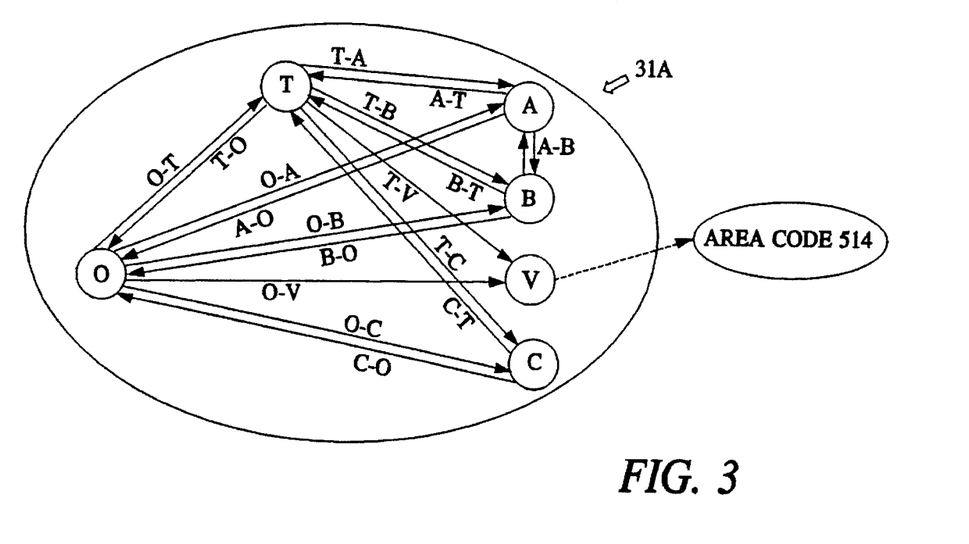
FIG. 3 illustrates represents nodes and links of the DCR network of FIG. 2.
Figure 4:
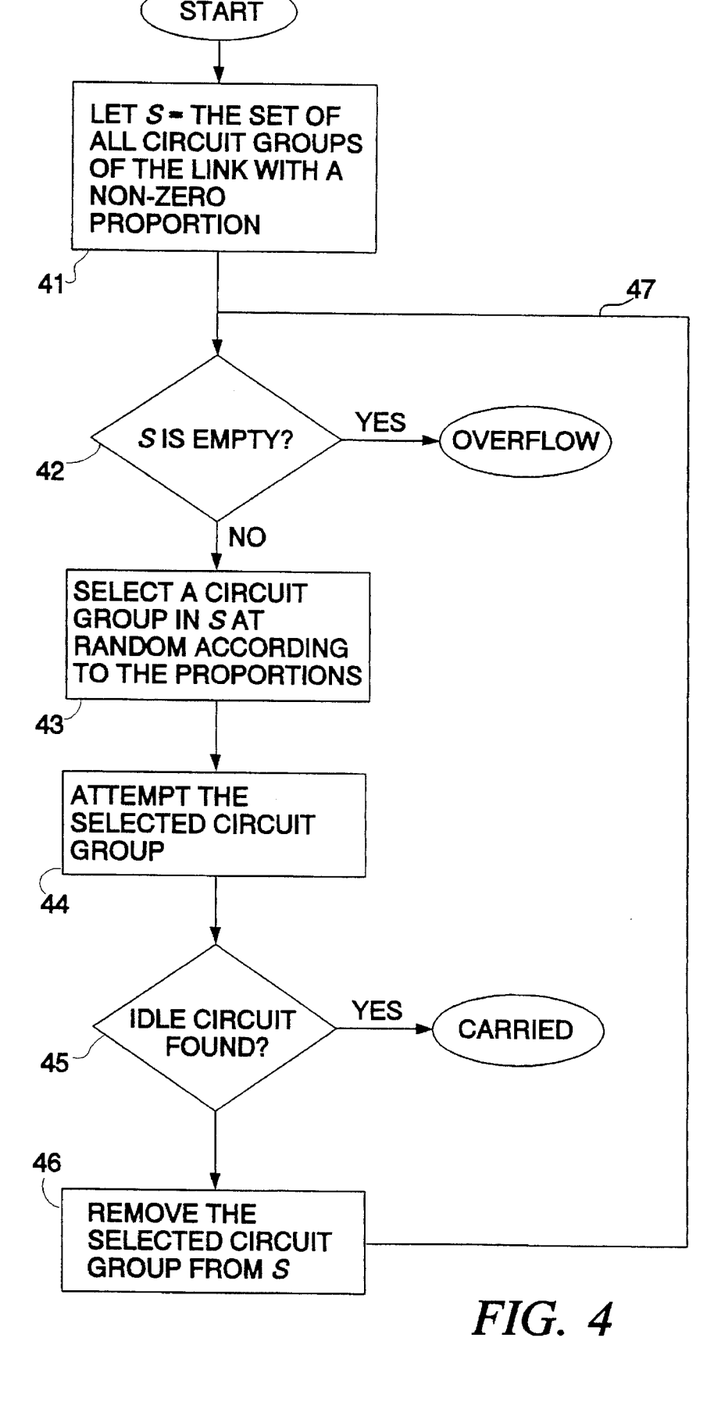
FIG. 4 is a simplified flowchart of an algorithm for determining call distribution within a link to the virtual node.

A specific embodiment of the present invention will now be described with reference to FIGS. 2 and 3 and the flowchart of FIG. 4. Comprehension of the invention will be facilitated by recognizing that the DCR network comprises a physical network of switches and interconnecting circuit groups; and a logical network of nodes and interconnecting network links; and there is not necessarily direct correspondence between physical switches and network nodes or between circuit groups and network links. The distinction can be seen from FIGS. 2 and 3, which illustrate, diagrammatically, a DCR network employing a virtual node according to the present invention. FIG. 2 illustrates the physical network of switches and interconnecting circuit groups whereas FIG. 3 illustrates network nodes and links. While the DCR network of FIGS. 2 and 3 is physically similar to that shown in FIG. 1, the operation differs, together with information stored at, and transmitted between, the switching elements and the NP.

2.1 Virtual Node

In DCR networks embodying the present invention, nodes are "places" known to the DCR network elements and to the NP. These "places" may be physical or logical. Nodes can play two different roles in the network:

Origin node: a physical entity that represents a switch that can route calls within the network. Each origin node must represent a different switch.

Destination node: a logical entity that represents a destination for DCR traffic. Most of the time, a destination node represents a switch. However, it may represent a group of switches, a subset of the subscriber lines of a given switch or any other entity to which traffic has to be routed.

While some nodes can act both as an origin and as a destination, a virtual node can only be a destination node. Generally, a virtual node may represent any physical group of one or more network elements, or any logical group of final destinations. The physical elements of the group (or the physical elements that can process any call to the logical group of final destinations) are called components. The routing depends on the entire group of components rather than on a single component.

A link from an origin node X to a destination node Y is composed of the circuit groups from X to Y. Therefore, if Y is a virtual node, the DCR link X-Y is composed of the circuit groups from X to each of the components of virtual node Y. There is however one exception: there is no link from X to Y if Y can be reached from X without using any circuit group, i.e. if X and Y are served by at least one common physical element.

Furthermore, virtual nodes are not used as origin nodes and do not have outgoing links. A virtual node does not need to communicate with the NP 25 and is used only as a destination node.

In FIG. 2, a virtual node V is represented by an ellipse V around switch parts a, b and c, which are components of the virtual node. Each of the switches a, b and c continues to be a node in its own right, so the DCR network, represented as nodes and links, is as shown in FIG. 3. The nodes are designated by upper case letters O, T, A, B, C and V and the links by pairs of upper case letters. The virtual node is created by programming the network processor 25 with information as to the components which correspond to the virtual node and each set of circuit groups which comprises a link to it. In addition, the other switches in the DCR network, i.e. which are not components of the virtual node, are apprised of the existence of the virtual node and its definition i.e. their routing tables include particulars for the virtual node along with those of other nodes. They are programmed to route a call to any of the components in the group if the call is destined for the virtual node.

Referring to FIGS. 2 and 3, the DCR network 31A comprises six nodes A, B, C, O, T, and V. Nodes A, B, C, 0, and T represent one switch each (switches a, b, c, o, and t respectively). Node V is a virtual node. It has three components, which are the "logical parts" of switches a, b, and c that handle calls to subscribers in area code 514. Switches a, b and c may still be used for other functions.

The same physical element can belong to more than one node. Therefore, the creation of a virtual node does not force other nodes to be eliminated, modified or created. Thus, switch a belongs both to node A and to node V, switch b belongs to nodes B and V, and switch c belong to nodes C and V. Conversely, switch b does not need to act as node B to be included in virtual node V.

In the DCR network shown in FIG. 3, there are 18 links. Sixteen of them are composed of only one circuit group. The link O-V is composed of the three circuit groups o-a, o-b and o-c; the link T-V is composed of the three circuit groups t-a, t-b and t-c. There are no A-V, B-V, or C-V links because a, b, and c are components of V. There are also no links from V, because it is a virtual node.

The same circuit group can belong to more than one link. For example, circuit group o-a belongs to the three links A-O, O-A, and O-V.

Each call is routed logically by the usual DCR algorithm, i.e. the direct link first if it exists and, if necessary and available, one two-link alternate route.

In the example, a call from O to V would attempt the link O-V, and possibly the two-link alternate route O-T-V. A call from B to T would attempt the link B-T, and possibly one of the two-link alternate routes B-A-T or B-O-T.

Whereas previously, in the DCR network 31 of FIG. 1, the area code 514 were in three groups associated with the three switches 12, 13 and 14, respectively, as their final destinations for calls fixed intermediate destination nodes, the network 31A of FIGS. 2 and 3 has all calls to area code 514 associated with the virtual node V instead. Thus, the virtual node V enables the use of a group of switches a, b, c (rather than a single switch) as an intermediate destination node. The switches in the group can then be used interchangeably as exit points for the final destination.

2.2 Intra-link Traffic Distribution Algorithm

As mentioned, in the DCR network, routing is node and link based, as opposed to switch and circuit group based. The links O-V and T-V to virtual node V are each composed of more than one circuit group, so the switch, o or t as the case may be, must determine the order in which these circuit groups should be attempted when the corresponding link has to be attempted. This permits control of intra-link traffic distribution by means of a novel algorithm residing at the switch.

The intra-link traffic distribution algorithm takes as parameters a proportion for each circuit group in the link to a virtual node and distributes the calls on these circuit groups randomly according to the specified proportions. The algorithm is represented by the flowchart of FIG. 4. Briefly, in step 41 and decision box 42, the switch determines whether or not S, the set of all circuit groups within the link with a non-zero proportion is empty. (If a circuit group has a zero proportion, e.g. because of temporary network management controls, it is excluded from consideration). If the set S is empty, and no circuit group is available, the call is treated as overflow. If the set is not empty, the switch selects a circuit group at random according to the proportions set out in the table (step 43) and attempts to route the call via that circuit group (step 44). If an idle circuit is found, (decision box 45), the call is carried. If no idle circuit is found, the switch removes the selected circuit group from the set S and returns via loop 47 to decision step 42. The cycle repeats until the call is carried or all circuit groups in the set S have been exhausted and the call overflowed.

When selecting a circuit group at random, the probability of selecting a given circuit group is always proportional to its specified proportion. For example, consider a link composed of three distinct circuit groups named o-a, o-b, and o-c. Assume that the proportions 50%, 30%, and 20% are specified for o-a, o-b, and o-c, respectively. When the link has to be attempted, the first circuit group attempted may be o-a, o-b, or o-c with probabilities ½, ³⁄₁₀, and ⅕, respectively (proportional (and equal in this case) to 50%, 30%, and 20%). If o-a is selected first and another circuit group is required, the next selected circuit group may be o-b or o-c with probabilities ⅗ and ⅖ respectively. If o-b is then selected and yet another circuit group is required, the next selected circuit group will be o-c with probability 1. If still another circuit group is needed, the call overflows the link since there are no more choices available.

Table I below summarizes how the calls are spread in the above example:

TABLE I

DISTRIBUTION OF CALLS
(WHEN THE DESIRED
PROPORTIONS ARE 50%-30%-20%)

| Order of Use of Circuit Groups | Proportion of Calls |
| --- | --- |
| o-a,o-b,o-c | $50\% \cdot \dfrac{30\%}{30\% + 20\%} = \dfrac{3}{10}$ |
| o-b,o-a,o-c | $30\% \cdot \dfrac{50\%}{50\% + 20\%} = \dfrac{3}{14}$ |
| o-a,o-c,o-b | $50\% \cdot \dfrac{20\%}{30\% + 20\%} = \dfrac{1}{5}$ |
| o-c,o-a,o-b | $20\% \cdot \dfrac{50\%}{50\% + 30\%} = \dfrac{1}{8}$ |
| o-b,o-c,o-a | $30\% \cdot \dfrac{20\%}{50\% + 20\%} = \dfrac{3}{35}$ |

TABLE I-continued

DISTRIBUTION OF CALLS (WHEN THE DESIRED PROPORTIONS ARE 50%-30%-20%)

| Order of Use of Circuit Groups | Proportion of Calls |
| --- | --- |
| o-c,o-b,o-a | $20\% \cdot \dfrac{30\%}{50\% + 30\%} = \dfrac{3}{40}$ |

The intra-link traffic distribution algorithm has no memory. Each time the link is attempted, all circuit groups (with non zero proportion) can be attempted, and the algorithm does not take into account choices of circuit groups made in previous link attempts.

2.3 Routing a Call

An example of how a call is routed will now be described with reference to FIGS. 2 and 3 and Table II below. As mentioned previously, information about nodes and links of the DCR network 31 is kept at each switch in special tables which are needed to implement DCR. Creation of the virtual node V requires changes to translation and/or routing tables to enable the switch to translate correctly address data of the call to identify destination node V and to the main DCR table which lists all nodes with the corresponding outgoing link and current alternate route recommendation for overflowing calls, specifically the identification of the directly-linked node to be used as a tandem. Table II is such a table for the switch at node O.

TABLE II

ROUTING TABLE AT SWITCH o

| | | Link Definition | | |
| --- | --- | --- | --- | --- |
| Destination Node Name | Current Recommendation | Circuit Group Index | Circuit Group Name | Associated Proportion |
| A | B | 1 | o-a | 100% |
| B | A | 1 | o-b | 100% |
| C | T | 1 | o-c | 100% |
| T | C | 1 | o-t | 100% |
| V | T | 1 | o-a | 50% |
| | | 2 | o-b | 30% |
| | | 3 | o-c | 20% |

Consider a call originating at node 0 and destined for final destination 514-555-5490. Switch o translates this number into the associated intermediate destination node, which is virtual node V. It then uses DCR to route the call to virtual node V. The first step is to attempt the direct link to V. To do this, the switch accesses routing table II, searches for node V, and then attempts to carry the call on the associated link O-V by executing the intra-link distribution algorithm described above. This link O-V contains the circuit groups o-a, o-b, and o-c. If the call overflows the direct link O-V (i.e. none of its circuit groups are available), the switch refers to the routing table for the current NP recommendation for V, which is T in this example, and then has to attempt the link to the recommended transit node T. To do this, the switch accesses the routing table II again, searches for node T, and then attempts to carry the call on the associated link O-T using circuit group o-t by executing the algorithm of the preceding section. If the call overflows this link, it overflows the DCR network 31 and receives the appropriate treatment.

If the call gets to the transit switch t, the number associated with the destination is once again translated by the switch t into the same intermediate destination node, which is V. Switch t recognizes that it is being used as a transit node because the call is incoming from a DCR switch (this is done by accessing another DCR table). Consequently, switch t may only attempt the direct link to virtual node V. To do this, the switch t accesses the main table, searches for node V, and then attempts to carry the call on the associated link T-V by executing the intra-link distribution algorithm as described above. This link T-V contains the circuit groups t-a, t-b, and t-c, but proportions at T need not be the same as those at O. If the call overflows this link, it overflows the DCR network and receives the appropriate treatment.

If the call gets to a, b, or c, it has reached its intermediate destination node, i.e. virtual node V, is recognized as such by a, b, or c during the translation process, and exits the DCR network. No DCR routing will occur at a, b, or c for calls to virtual node V. In fact, nodes A, B, and C do not know node V exists as it is not entered in the main DCR tables of their switches.

2.4 Status Reports

As mentioned previously, each DCR switch 10–14 monitors the occupancy of the circuit groups associated with it. When reporting to the NP 25, it reports the status of its outgoing links, including the number of idle circuits on its circuit groups and the total number of direct calls that overflowed the link during the period since the last update. The direct calls that overflowed the link include only the calls that overflowed all circuit groups of the link, as indicated in the intra-link traffic distribution algorithm described with reference to FIG. 4.

2.5 Protective Allowance and Safe Idle Circuits

In DCR networks, circuit groups can carry both direct-routed traffic and alternate-routed traffic. When a link becomes near saturation, it is preferable to discourage alternate-routed traffic from seizing the remaining idle circuits on the link, in order to allow traffic to complete directly. The DCR algorithm embodies a mechanism to achieve this purpose. This mechanism is based on protective allowance (PA). A PA is associated with each direct link. It reflects the need that the traffic has for circuits on its direct link. For details of such Protective Allowances the reader is directed to "Simulation of Dynamic Routing: Critical Path Selection Features for Service and Economy", W. H. Cameron, ICC Conference 1981; and "State-dependent Dynamic Traffic Management for Telephone Networks", Jean Regnier and W. H. Cameron, IEEE Communications, Nov. 1991, both of which are incorporated herein by reference.

In the DCR algorithm, access to alternate routes by traffic overflowing a direct link is influenced by the direct traffic that the links of the alternate routes support. For this purpose, a number of safe idle circuits (SIC) is computed for each link. It is defined as the difference between the number of idle circuits (IC) on the link and the PA of all the direct traffic that the circuit groups of the link support. The capacity of the alternate routes for a directly-connected pair is then based on the SIC values of their links. These computations apply only for determining the alternate route for traffic overflowing from a direct link. For traffic without a direct link, the alternate routes are based on the total number of Idle Circuits (IC), without taking into account the PAs.

In DCR without virtual nodes, the circuit group between two switches, say o, (associated with node O) and a (associated with node A), can belong to a maximum of two links: the O-A and A-O links. In this context, the SIC for the O-A and A-O links can be determined simply by considering the PA for the O-A and A-O direct traffic.

With the introduction of virtual nodes, the association between circuit groups and direct traffic becomes more complex. Links to virtual nodes are made of circuit groups which can also belong to other links. For instance, in the example of the preceding paragraph, if a is a component of a virtual node V, the circuit group o-a can also belong to link O-V, in addition to links O-A and A-O.

Links to virtual nodes are considered as single fully available entities for the purpose of routing and alternate route selection, just like links to non-virtual nodes. They have their own direct and overflow traffic, and link measurements. For purposes of routing, calls offered to a link to a virtual node have access to all the idle circuits on the link. For purposes of alternate route selection, a link to a virtual node is considered on the basis of global link measurements, such as its total number of idle circuits and the total PA that applies to its circuit groups.

As virtual nodes introduce their own links and direct traffic, and as these links can be defined with respect to the same circuit groups as other links, the relationship between circuit groups and direct traffic protection becomes more complex than with the previous DCR. In this new context, it becomes possible, and indeed desirable, to employ a new computation algorithm for the ICs and SICs so as to spread the reservation for direct traffic on all the circuit groups that may support it, and thereby better manage the competition for resources among the links that contain the same circuit group(s).

The new algorithm needs the following information to run:

$G_l$ The set of circuit groups of link l.

$L_g$ The set of the links that contain circuit group g.

$PA_l$ The protective allowance computed for link l, as in current DCR products and mentioned above.

$IC_g$ The reported number of idle circuits on circuit group g.

$P_{l,g}$ The proportion used for intra-link traffic distribution, for circuit group. g of link l. These proportions are those supplied by the user and used by the intra-link traffic distribution algorithm described above.

The new algorithm first computes, for each link l, the number of idle circuits $IC_l$ which is the sum of the numbers of idle circuits on each of its circuit groups:

$$IC_l = \sum_{g \in G_l} IC_g$$

Then, for each link, the PA value is distributed among the circuit groups of the link. The reservation $RSV_g$ on circuit group g is then equal to $$RSV_g = min\left( \sum_{l \in L_g} P_{l,g} \cdot PA_l, IC_g \right)$$

This produces a total reservation level $RSV_l$ for link l equal to:

$$RSV_l = \sum_{g \in G_l} RSV_g$$

Finally, for each link l, the number of safe idle circuits $SIC_l$ is equal to:

$$SIC_l = IC_l - RSV_l$$

These formulas enable the network processor to compute its recommendations for any node pair O-D, where D may be a virtual node, using the current DCR algorithm. This algorithm basically selects the two-link path O-T-D for which both links O-T and T-D are the most available.

If D is a virtual node, the link T-D may be composed of a plurality of circuit groups. The new recommendation algorithm is adapted to this situation since it takes into account the idle capacity on all the circuit groups of the links. Furthermore, reservation levels on circuit groups are taken into account for all alternate routed calls. This ensures "enlightened" routing recommendations from the network processor.

It should be appreciated that, although the preferred embodiment employs a virtual node to provide improved egress from the DCR network, as compared with networks in which calls must exit via a single switch, it is envisaged that virtual nodes will be employed in other ways and for other purposes. For example, groups of TOPS offices.

Although embodiments of the invention have been described and illustrated in detail, it is to be clearly understood that the same is by way of illustration and example only and is not to be taken by way of limitation, the spirit and scope of the present invention being limited only by the appended claims.

What is claimed is:

1. A telecommunications network comprising:

a plurality of network nodes and links,
the network nodes comprising origin nodes, each comprising a switching element capable of routing calls within the network, and destination nodes serving as destinations for such calls, some of said network nodes being tandem nodes, each tandem node serving as both a destination node and an origin node;
each link interconnecting directly an origin node and a destination node and comprising one or more circuit groups, each of the switching elements having storage means for routing information, the routing information comprising (i) a listing of destination nodes; (ii) associated with each destination node, a corresponding link, where such a link exists; (iii) for each link, a corresponding group of one or more circuit groups outgoing from the switching element; and (iv) associated with each destination node, a list of zero or more tandem nodes;

the network further comprising means for updating the routing information;

each switching element comprising means for translating address data of a call to determine a destination node for the call and
  (i) where a link to the destination node exists, attempting to route the call to the destination node via a circuit group that is in the link;
  (ii) where a link to the destination node is not available, accessing its routing table to select a tandem node and attempting to route the call via a link to the tandem node;

wherein said listing of destination nodes of at least one of said switching elements comprises a virtual destination node representing a group of two or more components, each component being a distinct physical network element, there being one or more distinct circuit groups associated with each component, and each link from a particular origin node to the virtual destination node is a set of circuit groups from the switching element at that particular origin node to the two or more components of the virtual destination node.

2. A network as claimed in claim 2, wherein a link to the virtual destination node comprises a plurality of circuit groups, the storage means of each switching element includes specified proportions for those circuit groups and, when attempting to route a call via the link to the virtual destination node, the switching element attempts the circuit groups randomly and in dependence upon the specified proportions.

3. A network as claimed in claim 1, wherein the updating means comprises network processor means communicating with the switching elements via a data communications system, the network processor means computing alternate routing information in dependence upon the information communicated thereto by all of the switching elements and periodically updating the information identifying tandem nodes.

4. A network as claimed in claim 3, wherein, when computing alternate route recommendations, the network processor means takes into account full availability of each of the links, including links composed of a plurality of circuit groups.

5. A network as claimed in claim 1, wherein the updating means comprises a common network processor coupled to each said switching element by a data communications system whereby, periodically, each said switching element communicates to the network processor information about network conditions local to the switching element and receives from the network processor alternate routing information including recommended tandem nodes, the network processor computing the alternate routing information for each switching element in dependence upon the information communicated thereto by all of the switching elements, and updating tandem node recommendations involving the virtual destination node on the basis of information communicated to the network processor by the switching elements.

6. A network as claimed in claim 5, wherein, when computing alternate route recommendations, the network processor takes into account full availability of each of the links, including links composed of a plurality of circuit groups.

* * * * *

UNITED STATES PATENT AND TRADEMARK OFFICE
CERTIFICATE OF CORRECTION

PATENT NO. : 5,526,414
DATED : June 11, 1996
INVENTOR(S) : François Bédard, Jean Régnier, France Caron It is certified that error appears in the above-indentified patent and that said Letters Patent is hereby corrected as shown below:

Col. 13, line 7    Delete "2" and insert --1--

Signed and Sealed this

Tenth Day of September, 1996

Attest:

BRUCE LEHMAN

*Attesting Officer*    *Commissioner of Patents and Trademarks*